United States Patent
Sartor (10) Patent No.: US 10,498,769 B2
(45) Date of Patent: Dec. 3, 2019

(54) MONITORING A PRIVACY RATING FOR AN APPLICATION OR WEBSITE

(71) Applicant: The Privacy Factor, LLC, Princeton Junction, NJ (US)

(72) Inventor: Mark A. Sartor, Princeton Junction, NJ (US)

(73) Assignee: The Privacy Factor, LLC, Princeton Junction, NJ (US)

( * ) Notice: Subject to any disclaimer, the term of this patent is extended or adjusted under 35 U.S.C. 154(b) by 0 days.

(21) Appl. No.: 15/948,693

(22) Filed: Apr. 9, 2018

(65) Prior Publication Data

US 2018/0248914 A1 Aug. 30, 2018

Related U.S. Application Data

(63) Continuation of application No. 15/393,138, filed on Dec. 28, 2016, now Pat. No. 9,942,276, which is a (Continued)

(51) Int. Cl.
*G06F 21/78* (2013.01)
*H04L 29/06* (2006.01)
(Continued)

(52) U.S. Cl.
CPC .............. *H04L 63/20* (2013.01); *G06F 21/53* (2013.01); *G06F 21/604* (2013.01);
(Continued)

(58) Field of Classification Search
None
See application file for complete search history.

(56) References Cited

U.S. PATENT DOCUMENTS 7,234,065 B2 6/2007 Breslin
7,269,853 B1 9/2007 Dunn
(Continued)

OTHER PUBLICATIONS

Detecting Changes in XML Documents. Cobena et al. IEEE. (Year: 2002).*

(Continued)

*Primary Examiner* — Venkat Perungavoor
(74) *Attorney, Agent, or Firm* — Sheppard, Mullin, Richter & Hampton LLP (57) ABSTRACT

A method, comprising: obtaining a current version of a policy associated with an application or website; comparing the current version against a previous version to identify differences in key words or phrases, each difference corresponding to interactions of the application or website, the interactions comprising use of computing device functionality or personal information; for each difference previously associated with a particular level of privacy risk, retrieving the particular level from a database; for each difference not previously associated with the particular level: generating a respective level of privacy risk associated with particular interactions of the application or website corresponding to the difference; associating the respective level to the difference; and storing in the database the difference and the respective level associated with the difference; generating a current privacy risk score based on each of the particular levels and on each of the respective levels associated with the one or more differences; determining if there was a privacy risk change; and if so, notifying the user.

20 Claims, 8 Drawing Sheets

Related U.S. Application Data continuation of application No. 15/003,626, filed on Jan. 21, 2016, now Pat. No. 9,571,526, which is a continuation of application No. 14/529,558, filed on Oct. 31, 2014, now Pat. No. 9,473,535, which is a continuation of application No. 14/161,462, filed on Jan. 22, 2014, now Pat. No. 8,918,632.

(60) Provisional application No. 61/755,566, filed on Jan. 23, 2013.

(51) Int. Cl.
    *G06F 21/53*    (2013.01)
    *G06F 21/60*    (2013.01)
    *G06F 21/62*    (2013.01)
    *G06F 21/71*    (2013.01)
    *G06F 16/951*    (2019.01)

(52) U.S. Cl.
CPC .......... *G06F 21/6245* (2013.01); *H04L 63/00* (2013.01); *H04L 63/1416* (2013.01); *H04L 63/1483* (2013.01); *G06F 16/951* (2019.01)

(56) References Cited

U.S. PATENT DOCUMENTS

| | | | |
|---|---|---|---|
| 7,512,985 B1* | 3/2009 | Grabarnik | G06F 21/6263 707/999.009 |
| 7,756,843 B1 | 7/2010 | Palmer | |
| 8,458,179 B2 | 6/2013 | Chow | |
| 2003/0001891 A1* | 1/2003 | Keohane | G06F 17/24 715/754 |
| 2004/0205538 A1* | 10/2004 | Banerjee | G06F 16/10 715/256 |
| 2005/0251738 A1* | 11/2005 | Hirano | G06F 17/2288 715/255 |
| 2006/0253345 A1 | 11/2006 | Heber | |
| 2007/0028159 A1* | 2/2007 | Ying | G06F 17/2288 715/201 |
| 2007/0260996 A1* | 11/2007 | Jakobson | G06F 17/2288 715/781 |
| 2007/0266420 A1 | 11/2007 | Hawkins | |
| 2008/0015927 A1 | 1/2008 | Ramirez | |
| 2008/0077848 A1* | 3/2008 | Roberts | G06F 17/2247 715/229 |
| 2008/0133500 A1 | 6/2008 | Edwards | |
| 2009/0083268 A1* | 3/2009 | Coqueret | G06F 8/71 |
| 2009/0144255 A1* | 6/2009 | Chow | G06F 21/6218 |
| 2010/0121773 A1 | 5/2010 | Currier | |
| 2011/0029566 A1* | 2/2011 | Grandison | G06Q 50/01 707/783 |
| 2011/0047594 A1 | 2/2011 | Mahaffey | |
| 2011/0145885 A1 | 6/2011 | Rivers | |
| 2011/0167474 A1 | 7/2011 | Sinha | |
| 2011/0246277 A1 | 10/2011 | Neldurg | |
| 2011/0252312 A1* | 10/2011 | Lemonik | G06F 17/248 715/255 |
| 2012/0005686 A1 | 1/2012 | Rajan | |
| 2012/0110674 A1 | 5/2012 | Belani | |
| 2012/0117457 A1* | 5/2012 | Yuniardi | G06F 17/2288 715/229 |
| 2012/0136862 A1* | 5/2012 | Glover | G06F 17/2211 707/737 |
| 2012/0233137 A1* | 9/2012 | Jakobson | G06F 3/04847 707/695 |
| 2012/0310937 A1 | 12/2012 | Stibel | |
| 2013/0152154 A1 | 6/2013 | Xiao | |
| 2013/0185804 A1* | 7/2013 | Biswas | G06F 21/577 726/26 |
| 2013/0227712 A1 | 8/2013 | Salem | |
| 2013/0297626 A1 | 11/2013 | Levi | |
| 2013/0340036 A1 | 12/2013 | Furukawa | |
| 2014/0096261 A1 | 4/2014 | Boldyrev | |

OTHER PUBLICATIONS

Ontology Versioning and Change Detection on Web. Klein et al. LNAI. (Year: 2002).*
"Terms of Service; Didn't Read," available at least since 2012 [retrieved at http://tosdr.org/ on Jul. 31, 2013].
Actiance, Inc., "License Analyzer," available at least by 2012 [retrieved at http://www.spywareguide.com/analyze/analyzer.php on Jan. 22, 2014].
Bal, Gokhan, "Revealing Privacy—Impacting Behavior Patterns of Smartphone Applications," Proceedings of the Mobile Security Technologies Workshop (MoST 2012), May 2012.
BrightFort LLC, "EULAlyzer," available at least by 2012 [retrieved from http://www.brightfort.com/eulalyzer.html on Nov. 14, 2013].
Felt, Adrienne Porter et al., "Android Permissions Demystified," Proceedings of the 18th ACM Conference on Computer and Communications Security (CCS '11), pp. 627-638, Oct. 2011.
KnowPrivacy, "KnowPrivacy: Affiliate Analysis," 2009 [retrieved at http://knowprivacy.org/affiliates.html on Jan. 22, 2014].
Liu, Kun et al., "A Framework for Computing the Privacy Scores of Users in Online Social Networks," ACM Transactions on Knowledge Discovery from Data (TKDD), vol. 5, Issue 1, Article 6, Dec. 2010.
PrivacyChoice LLC, "All about Privacyscore," available at least by 2012 [retrieved at http://privacyscore.com/faq on Jan. 22, 2014].
PrivacyChoice LLC, "PrivacyChoice," May 2013 [retrieved at http://privacychoice.org/wp-content/uploads/2013/05/Untitled.jpg, on Jan. 22, 2014].
PrivacyChoice LLC, "Privacyscore—Your Online Privacy Guide," available at least by 2012 [retrieved at http://privacyscore.com/ on Jan. 22, 2014].
ProfileWatch.org, "What is your Privacy Score?," 2010 [retrieved at http://profilewatch.org/ on Jan. 22, 2014].
Protect My Privacy, "iOS App Privacy Protection," available at least by 2012 [retrieved from http://www.protectmyprivacy.org/ on Aug. 7, 2014].
Raskin, Aza, "The 7 Things That Matter Most in Privacy," 2010 [retrieved at http://www.azarask.in/blog/post/what-should-matter-in-privacy/ on Jan. 22, 2014].

* cited by examiner

MONITORING A PRIVACY RATING FOR AN APPLICATION OR WEBSITE

CROSS-REFERENCE TO RELATED APPLICATIONS

This application is a continuation of U.S. patent application Ser. No. 15/393,138, filed Dec. 28, 2016, now U.S. Pat. No. 9,942,276, which is a continuation of U.S. patent application Ser. No. 15/003,626, filed Jan. 21, 2016, now U.S. Pat. No. 9,571,526, which is a continuation of U.S. patent application Ser. No. 14/529,558, filed Oct. 31, 2014, now U.S. Pat. No. 9,473,535, which is a continuation of U.S. patent application Ser. No. 14/161,462, filed Jan. 22, 2014, now U.S. Pat. No. 8,918,632, which claims the benefit of U.S. Provisional Patent Application Ser. No. 61/755,566, filed Jan. 23, 2013, each of which is hereby incorporated by reference herein.

FIELD

This technology generally relates to application privacy, and more particularly to methods for analyzing policies associated with applications and generating privacy ratings and devices thereof.

BACKGROUND

The advent of social networking and smart phones, and the corresponding proliferation of application software and web services, has resulted in users relinquishing rights to a significant amount of personal information. Most computing device users accept terms and conditions, permissions, privacy statements, or other privacy policies without reading them, and/or appreciating their provisions, in order to obtain applications. These policies are generally very long, complex, difficult to read, and non-negotiable. Unfortunately, by accepting such policies and using the associated applications, users often give up certain rights to their personal information and other content without realizing it. For example, location, address book content, message content and records, browsing history, and calendar content as well as videos, photos, written content, and expressed opinions on social networks are often obtained and used by application or service providers in a variety of ways that may be undesirable for the users and content owners.

In some cases, users may believe use of an application is governed by the policy of a provider of the application that is trusted, such as with respect to applications having millions of users that may be perceived as governed by the "crowd." However, policies by trusted providers often state that their provisions do not apply to third party applications that interface with trusted provider's application, resulting in a false sense of security for a user and, potentially, undesirable dissemination of personal information and content through the third party applications. Moreover, many policies are changed over time by application providers, including trusted providers, who often do not notify users or obtain their consent for the updated provisions. Although many application providers allow users to set privacy settings, the allowable settings may still result in unwanted dissemination of information and most users interact with applications according to their default settings.

While many policies contain provisions that are reasonable, necessary for effective operation of the application, and generally acceptable by users, application users do not currently have any way to easily and intuitively understand the rights they may be agreeing to in order to use an application. Additionally, application users are currently unable to easily obtain information that can be used to distinguish between benign and malevolent applications with respect to users' privacy. Accordingly, personal information and content is increasingly obtained and used by application providers, often to the detriment of inadequately informed application users.

SUMMARY

A method, non-transitory computer readable medium, and policy rating server device that receives a request from a client computing device for one or more privacy ratings is described and illustrated. The request identifies at least one application, such as an application installed on the client computing device for example. A policy associated with the identified application is obtained. The obtained policy is analyzed to identify a plurality of key words or phrases associated with use by the at least one application of functionality of, or personal information stored on, the client computing device. One or more privacy ratings are generated based on numerical values assigned to each of the identified key words or phrases. The generated one or more privacy ratings are output to the client computing device in response to the request.

A method, non-transitory computer readable medium, and client computing device that identifies initiation of an installation process for an application is described and illustrated. The installation process is suspended and a request for one or more privacy ratings associated with the application is sent to a privacy analyzing server device, the request including an indication of the application. The one or more privacy ratings are received from the privacy analyzing server device in response to the request. The received one or more privacy ratings are output, such as to a display of the client computing device for example. Instructions regarding whether to allow the installation of the application to proceed are obtained.

A method, non-transitory computer readable medium, and policy rating server device that retrieves a first version of a policy previously stored in a database and a second version of the policy is described and illustrated. Whether there are any differences between the first and second versions of the policy is determined. Notification preferences for one or more users are retrieved, when it is determined that there are differences between the first and second versions of the policy. One or more notifications to one or more of the users are sent based on the retrieved notification preferences.

A method, non-transitory computer readable medium, and client computing device that monitors at least one installed application during execution to identify actual interactions of the application with the client computing device. The interactions include at least use of functionality of the client computing device or use of personal information stored on the client computing device. Whether one of the actual interactions of the application deviate from one or more interactions of the application identified by one or more provisions of a policy associated with the application is determined. A default action is performed, when the one actual interaction is determined to deviate from the interactions identified by the one or more provisions of the policy associated with the application.

This technology provides a number of advantages including providing more effective methods, non-transitory computer readable medium, and devices for analyzing application privacy. With this technology, privacy ratings can be generated based on an analysis of policies associated with a profile of applications. The profile can be generated by user selections and/or applications installed on the user's device. The privacy ratings can be displayed visually and the profile can be customized by the user. The privacy ratings can also be provided while an application installation is suspended to allow a user to determine whether to continue based on the rating. Subsequent to installation, application activity can be monitored and compared against an associated policy to determine compliance and take default actions, such as obfuscating personal information transmitted by an application. Additionally, policies associated with applications can be monitored to identify changes and users can be alerted of policy changes that may affect the privacy rating of an application.

DETAILED DESCRIPTION

Figure 1:
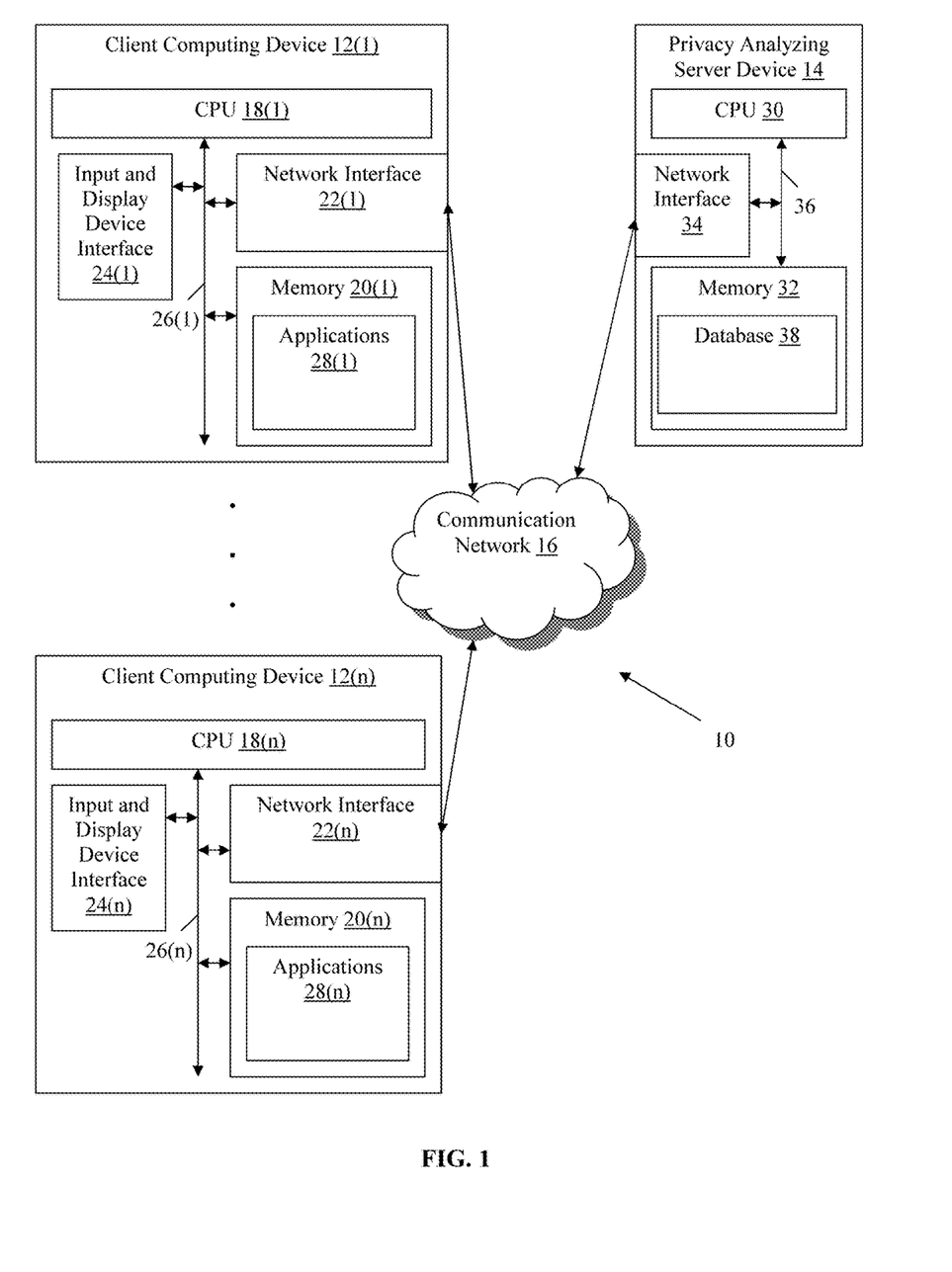
FIG. 1 a block diagram of a network environment with an exemplary privacy analyzing server device and exemplary client computing devices.

An environment 10 with client computing devices 12(1)-12(n) coupled to a privacy analyzing server device 14 by a communication network 16 is illustrated in FIG. 1, although this environment 10 can include other numbers and types of systems, devices, components, and elements in other configurations. While not shown, the environment 10 also may include additional network components, such as routers, switches and other devices, which are well known to those of ordinary skill in the art and thus will not be described here. This technology provides a number of advantages including methods, non-transitory computer readable medium, and devices that analyze application privacy and provide a privacy rating service for application users.

Each of the client computing devices 12(1)-12(n) includes one of the central processing unit (CPU) or processors 18(1)-18(n), memories 20(1)-20(n), network interfaces 22(1)-22(n), and input and display device interfaces 24(1)-24(n), which are coupled together by one of the buses 26(1)-26(n) or other link, although each can have other numbers and types of systems, devices, components, and elements in other configurations and locations can also be provided. The client computing devices 12(1)-12(n) can be mobile devices, such as smart phones or tablets, or desktop or laptop computers, or combinations thereof, for example.

The processors 18(1)-18(n) in each of the client computing devices 12(1)-12(n) executes a program of stored instructions for one or more aspects of the present technology as described and illustrated by way of the examples herein, although other types and numbers of processing devices and configurable hardware logic could be used and each of the processors 18(1)-18(n) could execute other numbers and types of programmed instructions.

The memories 20(1)-20(n) in each of the client computing devices 12(1)-12(n) store these programmed instructions for one or more aspects of the present technology, such as one or more computer programs 28(1)-28(n) (referred to herein as "applications"), as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18(1)-18 (n), can be used for the memories 20(1)-20(n).

The network interfaces 22(1)-22(n) in each of the client computing devices 12(1)-12(n) is used by each to operatively couple and communicate between the respective one of the client computing devices 12(1)-12(n) and the privacy analyzing server device 14 via the communication network 16, although other types and numbers of communication networks or systems with other types and numbers of connections and configurations can be used. By way of example only, the communication network 16 could use TCP/IP over Ethernet and industry-standard protocols, although other types and numbers of communication networks having their own communications protocol(s) can be used.

The input and display device interfaces 24(1)-24(n) in each of the client computing devices 12(1)-12(n) is used to enable a user to interact with each of the client computing devices 12(1)-12(n), such as to input and/or view data and/or to configure, program and/or operate the client computing devices 12(1)-12(n) by way of example only. Input devices may include a keyboard, computer mouse, and/or touch-screen and display devices may include a computer monitor, although other types and numbers of input devices and display devices could be used.

The privacy analyzing server device 14 includes a central processing unit (CPU) or processor 30, a memory 32, and a network interface 34 which are coupled together by a bus 36 or other link, although other numbers and types of systems, devices, components, and elements in other configurations and locations can be used. The processor 30 in the privacy analyzing server device 14 executes a program of stored instructions for one or more aspects of the present technology as described and illustrated by way of the examples herein, although other types and numbers of processing devices and configurable hardware logic could be used and the processor 30 could execute other numbers and types of programmed instructions.

The memory 32 in the privacy analyzing server device 14 stores these programmed instructions for one or more aspects of the present technology as described and illustrated herein, although some or all of the programmed instructions could be stored and executed elsewhere. Additionally, the memory 32 can include at least one database 38 for storing information, as described and illustrated in detail below. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 30, can be used for the memory 32.

The network interface 34 in the privacy analyzing server device 14 is used to operatively couple and communicate between the privacy analyzing server device 14 and the client computing devices 12(1)-12(n) via the communication network 16, although other types and numbers of communication networks or systems with other types and numbers of connections and configurations can be used.

Although examples of the privacy analyzing server device 14 and the client computing devices 12(1)-12(n) which are coupled together via the communication network 16 are described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art. The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
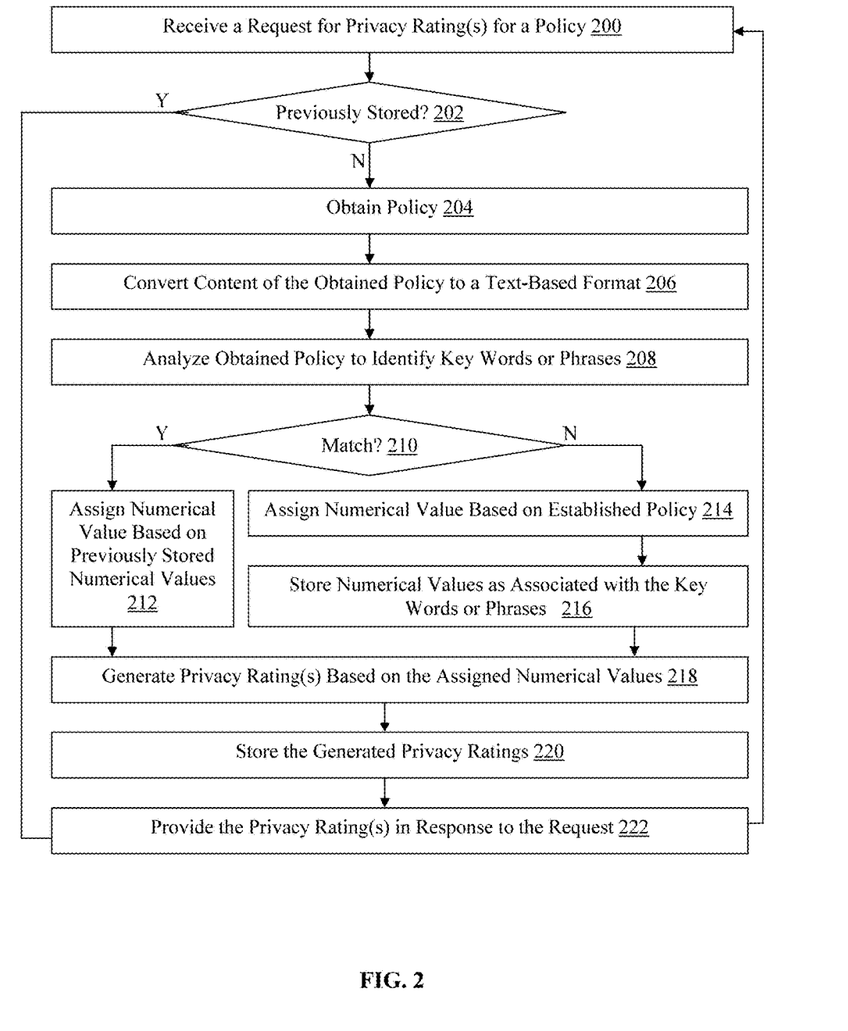
FIG. 2 is a flowchart of an exemplary method for analyzing application privacy level based on associated policy provisions.

Exemplary methods for analyzing application privacy will now be described with reference to FIGS. 1-8. Referring more specifically to FIG. 2, a method for analyzing a level of privacy of an application based on the provisions of a policy associated with the application is illustrated. In step 200 in this example, the privacy analyzing server device 14 receives a request for one or more privacy ratings for a policy. The request includes an indication of the policy or an application associated with the policy. The policy can be a privacy policy, terms and conditions agreement, data usage policy, terms of use, terms of service agreement, permissions, or any other agreement requiring acceptance prior to downloading, installing, and/or executing an application, social media policy, web site user policy, customer loyalty program agreement, or financial services agreement (collectively referred to herein as a "policy"), for example, although other types of policies can also be indicated in the request received in step 200.

In this example, the request can be sent from one of the client computing devices 12(1)-12 (n) and can include an indication of one of the applications 28(1)-28(n) stored in the corresponding one of the memories 20(1)-20(n) of, or in the process of being installed on, the client computing devices 12(1)-12(n). In one example, the request can be sent as a result of a user interaction with one of the applications 28(1)-28(n) that is configured to provide an interface to the privacy analyzing server device 14, such as a privacy analyzing application. In this example, the privacy analyzing application can be configured to send the request in response to identifying installation of a new application 28(1)-28(n), as described and illustrated below with reference to FIG. 3. Alternatively, the privacy analyzing application can be configured to send the request in response to identifying a previously installed application as part of an inventorying process and system analysis in which the method of FIG. 2 is performed for several previously installed applications identified in the inventory.

Figure 3:
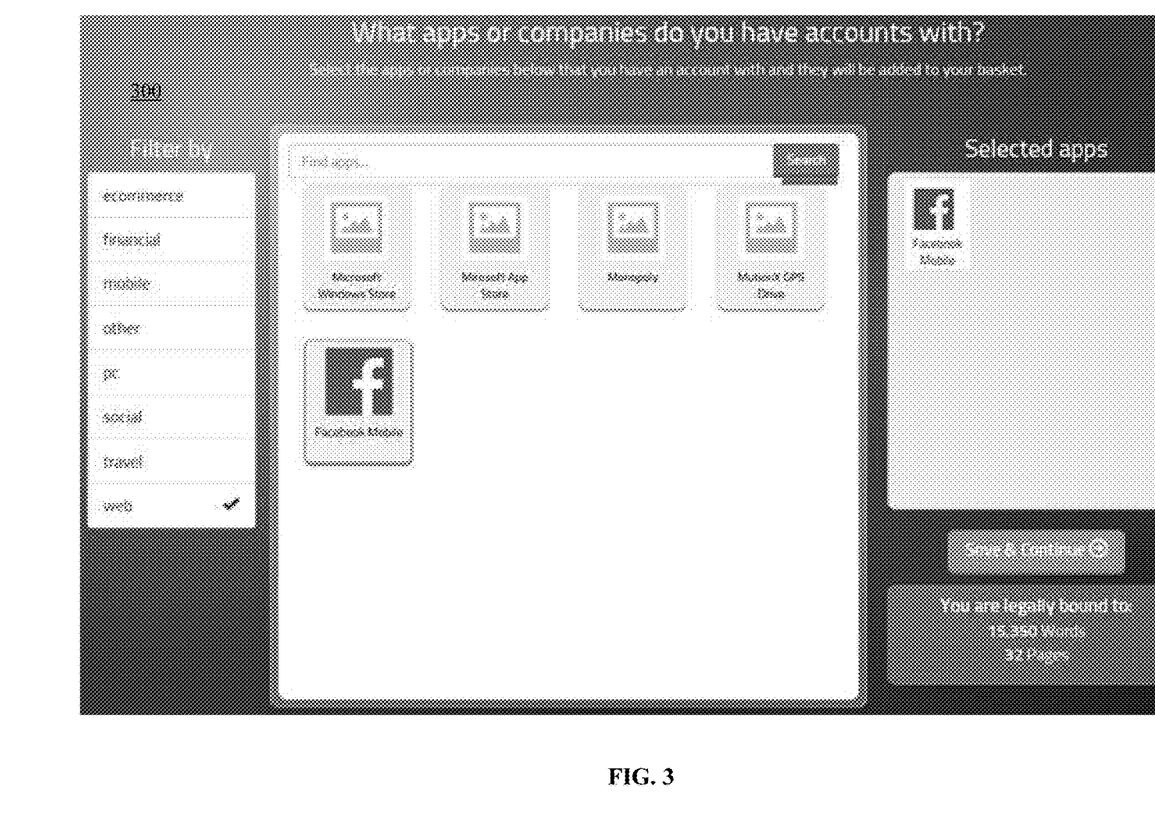
FIG. 3 is an exemplary graphical interface for obtaining a user profile of applications of interest to a user.

In another example, the request can be sent as a result of a user interaction with a web browser configured to communicate with a web service or one or more web pages provided by the privacy analyzing server device 14 and stored in the memory 32, irrespective of whether an application identified in the request was previously installed, or is currently being installed, on the client computing devices 12(1)-12(n) or whether the policy indicated in the request is associated with an application. Referring more specifically to FIG. 3, an exemplary interface 300 for facilitating creation of a profile to indicate applications for which the user would like to receive a detailed privacy analysis is illustrated. In this example, the user of the one of the client computing devices 12(1)-12(n) can select applications that are incorporated into a profile of selected applications for the user.

The list of selectable applications can be provided by the privacy analyzing server device 14 based on a database of applications or the list of selectable applications can reflect those application actually installed on the one of the client computing devices 12(1)-12(n), as identified during an inventory process and communicated to the privacy analyzing server device 14 providing the interface 300. Other methods of populating the list of selectable applications and generating a profile for a use can also be used.

Once the user of the one of the client computing devices 12(1)-12(n) has indicated the profile is complete in this example, the user can submit the profile including an indication of the selected application. The profile can then be received in step 200 by the policy rating server 200 in the form of a request for policy rating(s). Other methods for sending the request that is received by the privacy analyzing server device 14 in step 200 can also be used.

In this example, in step 202, the privacy analyzing server device 14 determines whether the requested privacy ratings have been previously stored, such as in the database 38, for example, as described below with reference to step 222. If the privacy analyzing server device 14 determines that the requested privacy ratings are not previously stored, then the No branch is taken to step 204.

In step 204, the privacy analyzing server device 14 obtains at least one policy. The policy can be automatically obtained by the policy rating server device 14 from a provider of the policy or application identified in the request, such as a developer of the application or an application store or marketplace offering the application for download. In this example, only one policy is obtained although, in other examples, multiple policies can be associated with an application identified in the request received in step 200.

In step 206, the privacy analyzing server device 14 selectively converts the content of the obtained policy to a machine-readable format. The machine-readable format can be a text-based format or any other format in which the policy rating server device 14 can interpret the contents of the policy based on the characters, words, and/or phrases included therein. For example, an optical character recognition technique can be performed by the privacy analyzing server device 14, as is known in the art, when a policy is obtained in a PDF or other graphic media format. Other methods of converting the policy can also be used and, in some examples, the policy is obtained in a text-based format and no conversion is necessary. Optionally, the privacy analyzing server device 14 stores the retrieved or converted content of the obtained policy in the database 38 as associated with the application associated with the policy.

In step 208, the privacy analyzing server device 14 analyzes the obtained policy to identify key words or phrases. The key words or phrases can be identified based on an established policy. In one example, the privacy analyzing server device 14 identifies at least some of the key words or phrases in step 208 based on a comparison of the contents of the policy to a plurality of key words or phrases stored in the database 38 and previously identified in other analyzed policies and/or stored by an administrator. Other methods of analyzing the obtained policy to identify key words or phrases can also be used.

In step 210, the privacy analyzing server device 14 determines whether any of the identified key words or phrases match any key words or phrases previously identified as key words or phrases and stored in the database 38. For each of the identified matches, the Yes branch is taken to step 212. In step 212, the privacy analyzing server device 14 assigns a numerical value to each of the identified key words or phrases based on a numerical value previously assigned to the corresponding key words or phrases as indicated in the database 38. For each of the identified key words or phrases not matching a previously stored key word or phrase, the No branch is taken to step 214.

In step 214, the privacy analyzing server device 14 assigns a numerical value based on an established policy or formula. The assigned numerical values can represent a relative level of privacy such as with respect to an application's use of functionality of, or personal information stored in the memories 20(1)-20(n) of, the client computing devices 12(1)-12(n). For example, a phrase indicating that a user's geographic location is periodically retrieved may be assigned a different numerical value than a phrase indicating that geographic location is retrieved, stored for a period of time, and shared with third parties in order to deliver and target advertising. Other factors, such as proximity of the key words or phrases to other words or phrases, can also be considered in assigning the numerical values. Once assigned, in step 216, the privacy analyzing server device 14 stores the numerical values in the database 38 as associated with the key words or phrases.

In step 218, the privacy analyzing server device 14 generates one or more privacy ratings based on the assigned numerical values. In one example, a privacy rating is generated for each of a plurality of privacy categories corresponding to various types of personal information or functionality of the client computing devices 12(1)-12(n). The privacy rating for a category can reflect interactions with the functionality and/or personal information implicated by the policy and/or rights to, or permissions associated with, personal information or other intellectual property that are potentially affected by the policy.

In some examples, the personal information can include e-mail, geographic location, browser history, address book, voice communications and call information, demographics, short message service (SMS) communications, multimedia messaging service (MMS) communications, purchases, stored media including photos, documents, and any other works of authorship or intellectual property, settings, device state, and/or calendar appointments, among others. In some examples, the interactions with the functionality and/or personal information include collecting or accessing, using, disposing, transferring or distributing, storing, owning, modifying, copying, and/or displaying, among others. Other privacy categories can also be used.

Optionally, the privacy analyzing server device 14 can analyze, such as in step 208 for example, the obtained policy to identify any references to other policies, which can also be obtained and analyzed according to the method shown in FIG. 2. The referenced policies, and/or the references to those policies, as well as other characteristics of the policy (e.g. whether there are opt-out provisions), can also be considered in generating the privacy ratings in step 218.

Also optionally, an overall privacy rating for the application can be generated based on an aggregation of the privacy ratings generated for each privacy category. Additionally, other methods of analyzing the policy, identifying key words or phrases, assigning numeric values, and/or generating privacy ratings, can also be used. A manual review or manual input by an administrator can also be provided subsequent to any of steps 208, 214, and/or 218, for example. Once generated, in step 220, the privacy analyzing server device 14 stores the privacy ratings as associated with the application or an indication of the policy in the database 38, for example.

Referring back to step 202, if the privacy analyzing server device 14 determines that the requested privacy ratings are previously stored, such as by prior performance of steps 204-220 with respect to the policy, then the Yes branch is taken to step 222. In step 222, the privacy analyzing server device 14 provides the previously stored privacy ratings to the requesting client computing device 12(1)-12(n) in response to the request.

Figure 4:
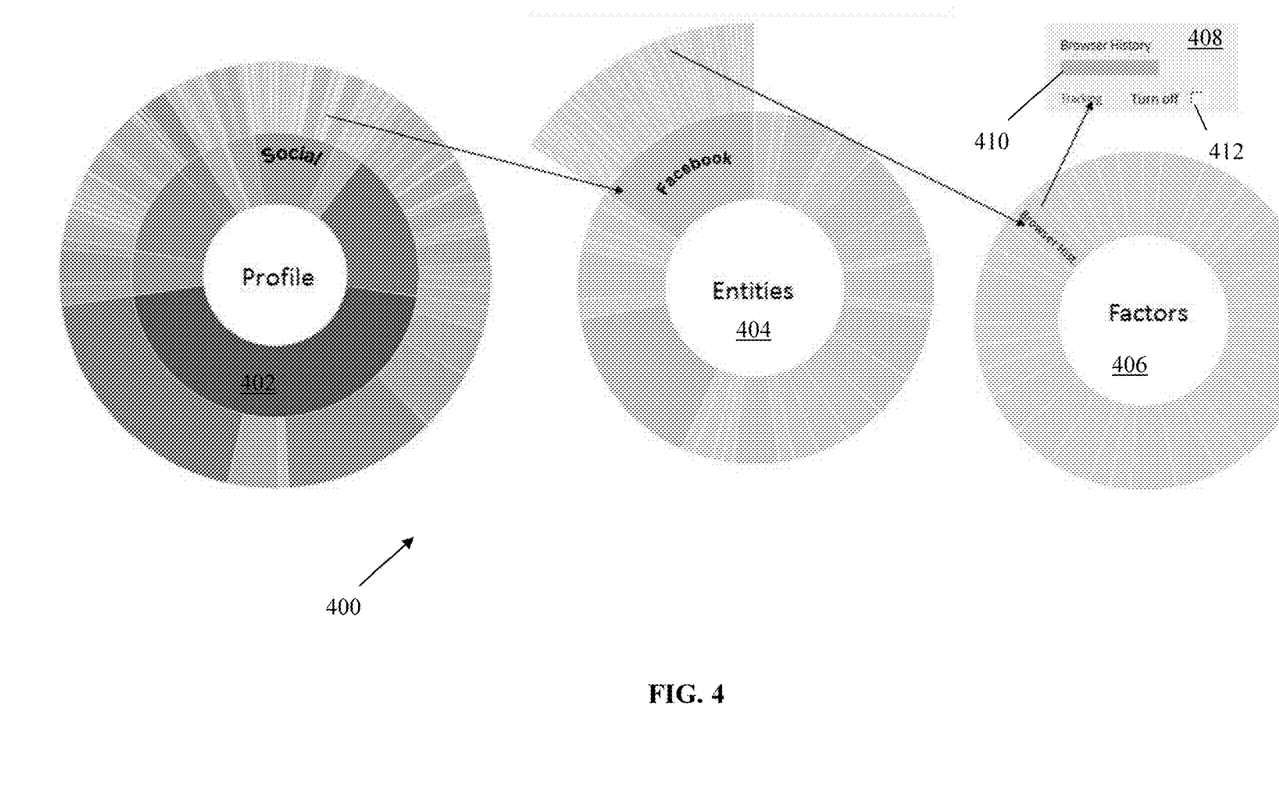
FIG. 4 is an exemplary graphical visualization interface for displaying privacy rating(s) and/or customizing a user profile.

Referring more specifically to FIG. 4, an exemplary visualization interface 400 for displaying privacy rating(s) and/or customizing a user profile is illustrated. Optionally, the visualization interface 400 can be provided to the requesting client computing device 12(1)-12(n) in step 224. In this example, the visualization interface 400 includes a profile graphic, an entities graphic 404, and a factors graphic 406, although other types and numbers of graphics can also be provided. The profile graphic 402 in this example provides categories of applications for a user, such as included in the user profile used in step 200 and obtained as described and illustrated with reference to FIG. 3. In this example, "social" is a category included in the profile graphic 402.

By selecting the "social" portion of the profile graphic 402, the entities graphic 404 is displayed on the visualization interface 400. The entities graphic in this example includes an indication of all of the applications in the user profile associated with the "social" category. In this example, "Facebook" is one of the applications included in the user profile. Optionally, "Facebook" is one of the applications 28(1)-28(n) installed on one of the client computing devices 12(1)-12(n) associated with the user.

By selecting the "Facebook" portion of the entities graphic 404, the factors graphic 406 is displayed on the visualization interface 400. The factors graphic in this example includes an indication of all of the factors or categories that a privacy rating is generated for or that are used to generate an overall privacy rating for the "Facebook" application, for example, as described and illustrated earlier with reference to step 220. In this example, "Browser History" is a factor included in the factors graphic 406 for the "Facebook" entity or application. The factors associated with an application can be identified based on the analysis of the policy associated with the application, as described and illustrated earlier with reference to step 210.

By selecting the "Browser History" portion of the factors graphic 406, a browser history pop-out 408 is displayed on the visualization interface 400. The browser history pop-out 408 in this example includes a visual indication of a privacy rating 410 for this factor and a tracking check box 412. Optionally, the tracking check boxes can be provided on pop-outs corresponding to factors for which the privacy analyzing server device 14 determines, based on the analysis of the policy associated with the application, can be disabled according to user preference while maintaining compliance with the policy. By selecting the tracking check box 412 in this example, the browser history factor can be removed from the analysis and generation of the overall privacy rating for the associated application.

Optionally, the tracking check box 412 can be linked to preferences stored on the client computing device 12(1)-12(n) associated with the user such that selection of tracking check box sets or reset the corresponding preference thereby altering the operation of the corresponding application with respect to the associated factor. Accordingly, in this example, the user can change the preference for the "Facebook" application that allows the application to obtain or monitor browser history by selecting the tracking check box 412. Other types of visualization interfaces for displaying privacy rating and tracking preferences associated with a user profile can also be used.

Figure 5:
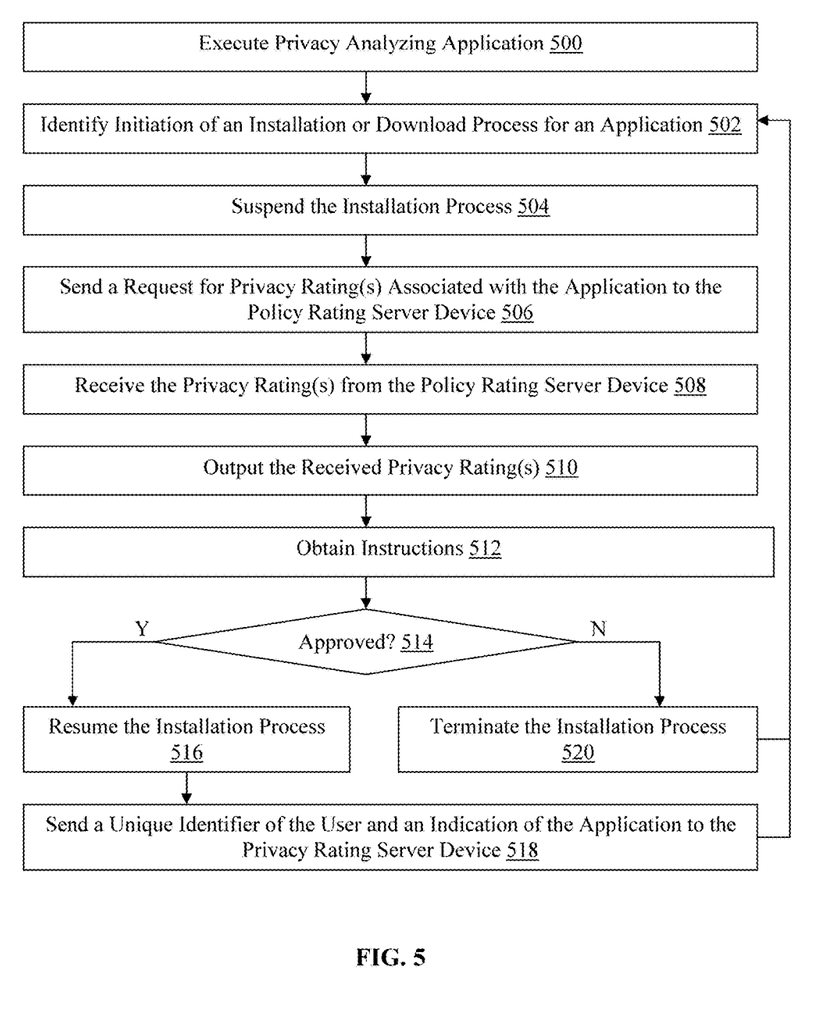
FIG. 5 is a flowchart of an exemplary method for receiving a privacy rating request in response to intercepting installation of an application.

Referring more specifically to FIG. 5, an exemplary method of receiving a privacy rating request in step 200 from one of the client computing devices 12(1)-12(n) in response to intercepting installation of an application is shown. In step 500, a user of one of the client computing devices 12(1)-12(n) executes a privacy analyzing application, which can be one of the applications 28(1)-28(n) stored in one of the memories 20(1)-20(n), for example.

In step 502, the one of the client computing devices 12(1)-12(n) identifies initiation of an installation process for an application. As used herein, an installation process includes downloading, transferring, or any other process of obtaining or initially executing an application on the one of the client computing devices 12(1)-12(n). In one example, the privacy analyzing application can operate in the background and can selectively communicate with an operating system of the one of the client computing devices 12(1)-12(n), for example, to determine whether an application is in the process of being installed. In another example, the privacy analyzing application can communicate with a marketplace or application store application configured to facilitate installation of other applications, for example, to determine whether an application is in the process of being installed. Other methods of determining whether an application is in the process of being installed can also be used.

In step 504, the one of the client computing devices 12(1)-12(n) suspends the installation process for the application such as by communicating with the operating system or marketplace or application store application, for example.

In step 506, the one of the client computing devices 12(1)-12(n) sends a request for one or more privacy ratings associated with the application to the policy rating server device 14, which is received by the policy rating server device 14 as described and illustrated above with reference to step 200. In one example, the requested privacy ratings can be a default set of privacy ratings established by the policy analyzing application. In another example, the user can be prompted to select one or more privacy ratings prior to the request being sent and the request can include an indication of the selected privacy ratings.

In step 508, the one of the client computing devices 12(1)-12(n) receives the requested privacy ratings from the policy rating server device 14. The requested privacy ratings can be generated as described and illustrated above with reference to FIG. 2, and specifically step 220. Once received, in step 510, the one of the client computing devices 12(1)-12(n) outputs the privacy ratings, such as to a display of the one of the client computing devices 12(1)-12(n) using the corresponding one of the input and display device interface 24(1)-24(n).

In step 512, the one of the client computing devices 12(1)-12(n) obtains instructions from a user of the one of the client computing devices 12(1)-12(n) regarding whether the installation should be allowed in view of the privacy ratings for the application output in step 510. In step 514, the one of the client computing devices 12(1)-12(n) determines whether the instructions indicate that the user has approved the installation of the application.

If the one of the client computing devices 12(1)-12(m) determines that the user has approved the installation of the application, then the Yes branch is taken to step 516. In step 516, the one of the client computing devices 12(1)-12(n) resumes the installation process that was previously suspended in step 504. In step 518, the one of the client computing devices 12(1)-12 (n) sends a unique identifier of the user and an indication of the application to the privacy analyzing server device 14. The privacy analyzing server device 14 can then store the indication of the application as associated with the user in the database 38 to be used as described and illustrated below with reference to FIG. 8.

If the one of the client computing devices 12(1)-12(n) determines that the user has not approved the installation of the application, then the No branch is taken to step 520. In step 520, the one of the client computing devices 12(1)-12 (n) terminates the installation process that was previously suspended in step 504. Accordingly, with this technology, a user of one of the client computing devices 12(1)-12(n) can obtain an indication of one or more privacy ratings for an application, based on a policy associated with the application, in order to make a more informed decision regarding whether to install, and subsequently execute, the application on the one of the client computing devices 12(1)-12(n).

Figure 6:
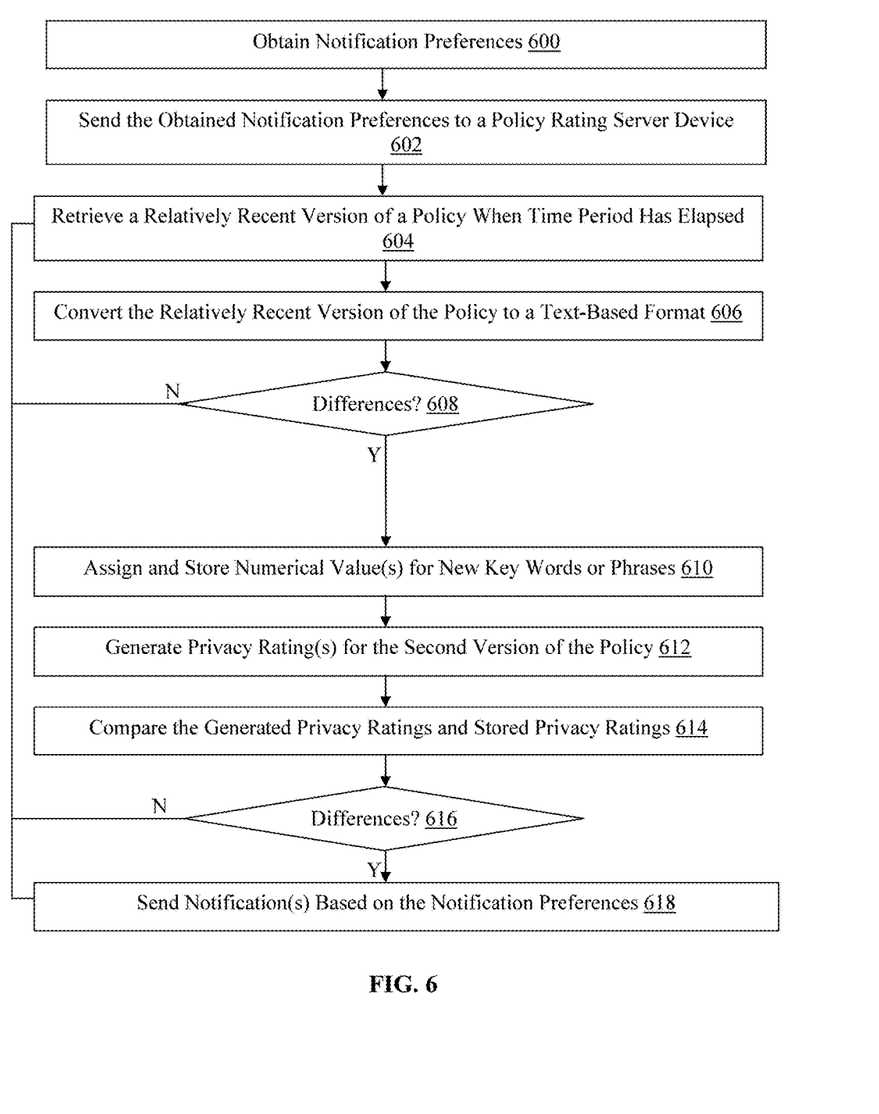
FIG. 6 is a flowchart of an exemplary method for providing a notification service for policy changes to subscribed users.

Referring more specifically to FIG. 6, an exemplary method of providing a notification service for policy changes to one or more subscribed users of the client computing devices 12(1)-12 (n) is shown. In step 600, the one of the client computing devices 12(1)-12(n) obtains notification preferences from a user. The notification preferences can be obtained upon an initial execution of the privacy analyzing application, for example, and can be subsequently changed by the user through interaction with the policy analyzing application.

Figure 7:
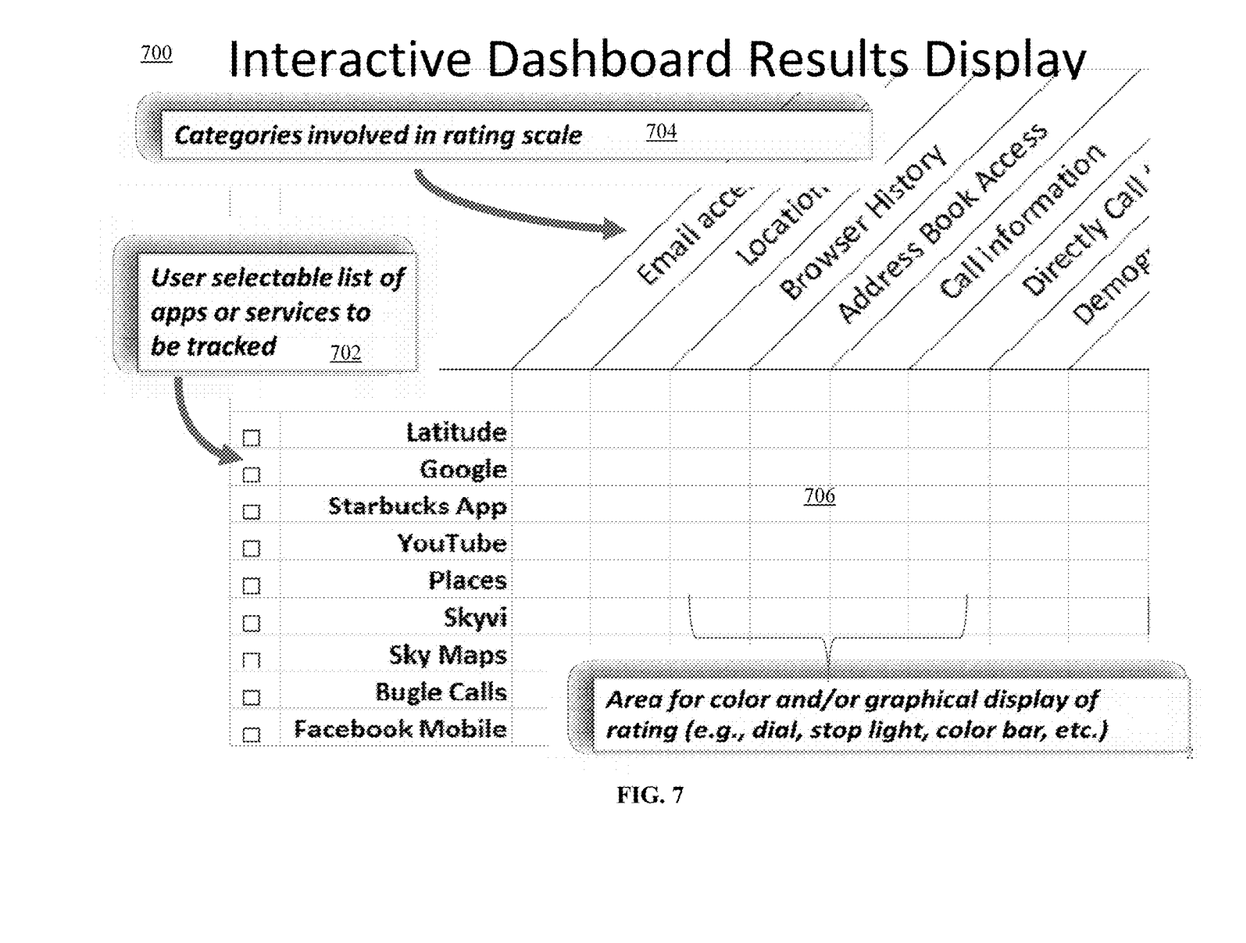
FIG. 7 is an exemplary graphical dashboard interface for obtaining tracking preferences and user profile selections.

Referring specifically to FIG. 7, an exemplary dashboard 700 for obtaining notification preferences is illustrated. The dashboard 700 provides an interface for a user of one of the client computing devices 12(1)-12(n) to submit the notification preferences in step 600, although other methods of obtaining the notification preferences can also be used. The dashboard 700 or any other means of selection can be displayed to the user upon executing the privacy analyzing application or can be accessed by the user of the one of the client computing devices 12(1)-12(n) using a web browser, for example.

In this example, the dashboard 700 includes a plurality of categories 704 along a first axis and list of applications 702 along another axis. Optionally, the list of applications 702 represent the application installed on the one of the client computing devices 12(1)-12(n). In order to determine the application installed on the one of the client computing devices 12(1)-12 (n), the policy rating server device 14 can query the database 38 to identify the applications associated with the user as sent to the policy rating server device 14 as described and illustrated earlier with reference to step 518, for example. In other examples, the list of applications 702 is not associated with the application installed on the one of the client computing devices 12(1)-12 (n) and instead represents at least a subset of the applications for which the policy rating server device 14 is storing one or more policy ratings.

Additionally, the list of applications 702 can include other policies or legal documents, including legislation for example, not associated with any application. In this example, the list of applications 702 is selectable such that the user of the one of the client computing devices 12(1)-12 (n) can indicate to the policy rating server device 14 a preference for tracking one or more of the applications in the list 702. Optionally, the dashboard 700 further includes inputs to allow a user of one of the client computing devices 12(1)-12(n) to submit how (e.g., e-mail or text message) the user is to receive notifications regarding changes to policies associated with applications 28(1)-28(n) installed on the one of the client computing devices 12(1)-12(n).

Referring back to FIG. 6, in step 602, the one of the client computing devices 12(1)-12( n) sends the obtained notification preferences to the policy rating server device 14, which can store the notification preferences in the database 38, for example, as associated with the user. In step 604, the privacy analyzing server device 14 retrieves a relatively recent version of a policy when the policy rating server device 14 determines a specified time period has elapsed since a version of the policy was last retrieved. The policy could have been stored with reference to step 206, although other methods of obtaining the policy retrieved in step 600 can also be used. Optionally, relatively recent versions of a plurality of policies are retrieved on a periodic basis.

In step 606, the policy rating server device 14 converts the relatively recent version of the policy to a text-based format, such as described and illustrated earlier with reference to step 206. In step 608, the policy rating server device 14 compares the relatively recent version of the policy to a previously obtained version based on key words or phrases associated with the previously obtained version. If the privacy analyzing server device 14 determines that there are no difference between the relatively recent and previously obtained versions of the policy, then the No branch is taken to step 604 and another relatively recent version of the same or a different policy is retrieved.

If the privacy analyzing server device 14 determines that there are differences between the relatively recent and previously obtained versions of the policy, then the Yes branch is taken to step 610. In step 610, the policy rating server device 14 identifies any new or changed key words or phrases in the recently obtained version of the policy. For any new or changed key words or phrases, the policy rating server device 14 assigns numerical values to the key words or phrases and stores the assigned numerical values in the database 38 as associated with the key words or phrases, and optionally an indication of the policy, as described and illustrated above with reference to step 216-218. Additionally, an indication of the new or changed key words or phrases can be stored and subsequently provided according to the notification preferences so that a user can view the changed key words or phrases.

In step 612, the privacy analyzing server device 14 generates one or more privacy ratings for the recently obtained version of the policy, such as described and illustrated above with reference to step 220. In step 614, the privacy analyzing server device 14 compares the generated privacy ratings to the stored privacy ratings associated with the previously obtained version of the policy. In step 616, the policy rating server device 14 determines whether there are any differences between the generated privacy ratings and the stored privacy ratings. For example, a difference in privacy ratings may result when the second version of the policy provides for a different scope of rights with respect to a user's personal information, although other differences in the policy versions implicating different rights or interactions with the user's device can also result in a difference in privacy ratings.

If the privacy analyzing server device 14 determines, in step 616, there is not at least one difference between at least one of the generated privacy ratings and at least one of the stored privacy ratings, then the No branch is taken to step 604 and another version of the same or a different policy is retrieved. If the privacy analyzing server device 14 determines, in step 616, there is at least one difference between at least one of the generated privacy ratings and at least one of the stored privacy ratings, then the Yes branch is taken to step 618.

In step 618, the policy rating server device 14 sends one or more notifications based on the tracking preferences obtained as described above with reference to steps 600-604 and optionally stored in the database 38. Accordingly, a user of one of the client computing devices 12(1)-12(n) can indicate in the notification preferences that an e-mail should be sent to a specific e-mail address whenever a change in privacy rating for the e-mail category for an installed application is generated. Additionally, the notification preferences can indicate that an e-mail should be sent whenever a change in a policy for an application is determined in step 608, irrespective of any effect the change might have on the privacy ratings associated with the application. Other notification preferences can also be used.

Accordingly, with this technology, a user of one of the client computing devices 12(1)-12 (n) can subscribe to a service provided by the policy rating server device 14 whereby notifications and/or recommendations are sent whenever policies, or associated privacy ratings, associated with the user have changed. While many policies include provisions allowing the policy provider to unilaterally change the policy subsequent to acceptance by a user of a prior version, this technology will allow a user to make a more informed decision regarding whether to continue utilizing services, such as applications installed on the one of the client computing devices 12(1)-12(n).

Referring to FIGS. 1-8, an exemplary method of analyzing application operation with respect to associated policy provisions is shown. In this example, in step 800, a user of one of the client computing devices 12(1)-12(n) executes a privacy analyzing application, which can be one of the applications 28(1)-28(n) stored in the memories 20(1)-20(n), for example. Optionally, the privacy analyzing application is the same application executed as described and illustrated above with reference to step 400, although a different privacy analyzing application can also be executed.

Figure 8:
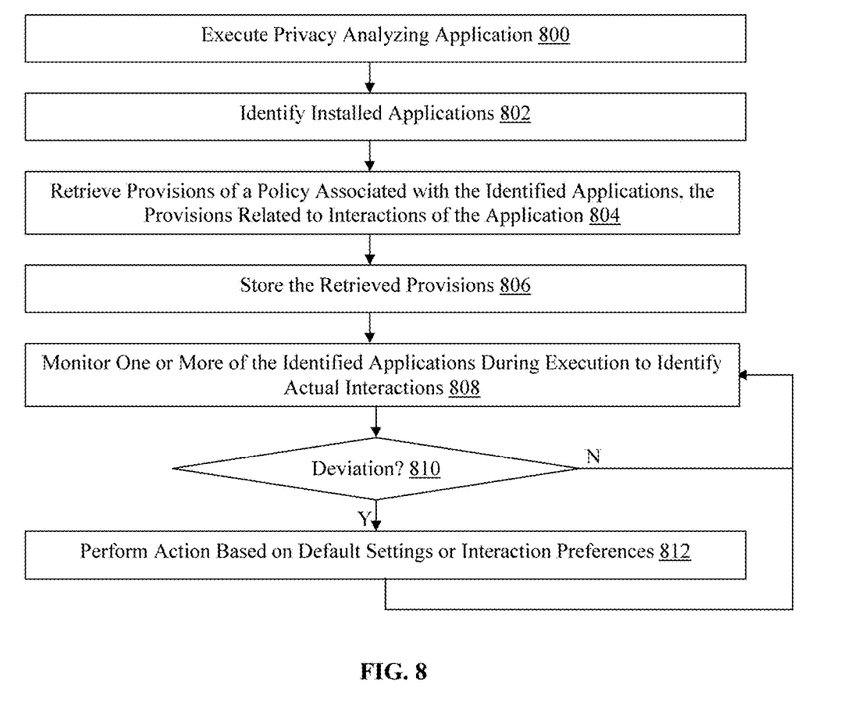
FIG. 8 is a flowchart of an exemplary method for analyzing application operation with respect to associated policy provisions.

In step 802, the one of the client computing devices 12(1)-12(n) identifies a plurality of the applications 28(1)-28(n) installed on the one of the client computing devices 12(1)-12(n), such as by communicating with an operating system or by any other method. Once identified, in step 804, the one of the client computing devices 12(1)-12(n) retrieves one or more policies associated with at least a subset of the applications, as described and illustrated above with reference to step 204, and analyzes the policies to identify provisions related to interactions of an application associated with each of the policies.

For example, a provision in a policy associated with an application may indicate that by, accepting the terms, the user and policy provider are acknowledging, that the policy provider will not access media stored in the corresponding one of the memories 20(1)-20(n) of the client computing devices 12(1)-12(n). The provisions of the policies related to interaction of the application with functionality or personal information of the one of the client computing devices 12(1)-12(n) can be identified based on identifying key words or phrases, based on an established and previously stored plurality of key words or phrases, and/or based on an administrator review, for example. Other methods for retrieving provisions of policies related to interaction of the applications associated with the policies can also be used. Once retrieved, in step 806, the one of the client computing devices 12(1)-12(n) can store the retrieved provisions in the corresponding one of the memories 20(1)-20(n) as associated with a corresponding one of the applications 28(1)-28 (n).

In step 808, the one of the client computing devices 12(1)-12(n) monitors one or more of the applications identified in step 802 during execution to identify actual interactions with functionality or personal information of the one of the client computing devices 12(1)-12(n). In one example, the privacy analyzing application can operate in the background and actively monitor the tasks performed by other applications 28(1)-28(n). In another example, the privacy analyzing application can passively monitor the tasks performed by other applications 28(1)-28( n) such as by receiving notifications from functionality (e.g. global positioning system (GPS) transceiver or an external memory storage device interface) that an application 28(1)-28(n) is attempting to interact with the functionality or personal information.

In step 810, the one of the client computing devices 12(1)-12(n) compares the actual monitored interactions of each application 28(1)-28(n) with the interactions identified in the retrieved and stored provisions of an associated policy to determine whether there is a deviation. With respect to the example described above, a deviation can be the application 28(1)-28(n) requesting access to video files stored on an external memory storage device despite provisions in the associated policy indicating that the user's media would not be accessed by the application 28(1)-28(n). Other types and numbers of deviations can also be determined. If, in step 810, the one of the client computing devices 12(1)-12(n) determines that there has been a deviation, then the Yes branch is taken to step 812.

In step 812, the one of the client computing devices 12(1)-12(n) performs an action based on default settings or interaction preferences obtained from the user and stored in the corresponding one of the memories 20(1)-2(n). In one example, the default action can include displaying, with the privacy analyzing application, a notification on a display screen of the one of the client computing devices 12(1)-12 (n) regarding the deviation and requesting instructions with respect to whether to allow the application to proceed or block the interaction. Optionally, the notification can include a recommended action that the user of the one of the client computing devices 12(1)-12(n) can take in response to the interaction.

Alternatively or in combination, the action can be based on an interaction preference previously established by the user including automatically blocking, with the privacy analyzing application, the one of the applications 28(1)-28 (n) from accessing the video files without waiting for instructions from the user. In yet another example, the action can include obfuscating data associated with the interaction. In this example, the interaction can include obtaining personal information stored on the one of the client computing devices 12(1)-12(n). Accordingly, the personal information can be obfuscated such as by replacing the requested information with generic information or random information, for example. Other actions, default settings, and interaction preferences can also be used.

Accordingly, with this technology, a user of one of the client computing devices 12(1)-12 (n) can be informed when one of the applications 28(1)-28(n) attempts to deviate beyond the scope of an associated policy with respect to interactions by the one of the applications 28(1)-28 (n) with functionality of, or personal information stored on, the one of the client computing devices 12(1)-12(n).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

The invention claimed is:

1. A method of monitoring privacy risk, the method comprising:
   awaiting satisfaction of a trigger condition;
   upon detecting the satisfaction of the trigger condition, obtaining a current version of a policy associated with an application or website, the current version of the policy being in a machine-readable format;
   comparing the current version of the policy against a previous version of the policy associated with the application or website to identify one or more differences in key words or phrases, the one or more differences in key words or phrases including one or more added key words, added phrases, removed key words, or removed phrases, each of the one or more differences in key words or phrases corresponding to one or more interactions of the application or website, the one or more interactions comprising use of functionality of a computing device or use of personal information of a user;
   for each difference in key word or phrase previously associated with a particular level of privacy risk, retrieving the particular level of privacy risk for the difference in keyword or phrase from a database;
   for each difference in keyword or phrase not previously associated with the particular level of privacy risk:
      generating a respective level of privacy risk associated with one or more particular interactions of the application or website corresponding to the difference in key word or phrase;

associating the respective level of privacy risk to the difference in key word or phrase; and storing in the database the difference in key word or phrase and the respective level of privacy risk associated with the difference in key word or phrase;

generating a current privacy risk score based at least on each of the particular levels of privacy risk and on each of the respective levels of privacy risk associated with the one or more differences in key words or phrases for the current version of the policy associated with the application or website;

determining if there was a privacy risk change based on the current version of the policy in view of the previous version of the policy; and if there was a privacy risk change, then notifying the user of the privacy risk change.

2. The method of claim 1, wherein the trigger condition includes a determination whether a predetermined amount of time has elapsed.

3. The method of claim 1, wherein the trigger condition is based on a notification preference set by the user.

4. The method of claim 1, wherein the previous version of the policy includes a stored version of the policy that was used to generate a previous privacy risk score.

5. The method of claim 1, wherein the current privacy risk score indicates a level of privacy risk associated with the application or website.

6. The method of claim 1, wherein the current privacy risk score indicates a level of privacy risk associated with a category associated with the application or website.

7. The method of claim 1, wherein the privacy risk change includes a change between the current privacy risk score and a previous privacy risk score.

8. The method of claim 1, wherein the privacy risk change includes a change in the one or more interactions of the application or website.

9. The method of claim 1, wherein the step of generating the current privacy risk score for the application or website comprises:

generating a current privacy risk score for the current version of the policy based at least on each of the particular levels of privacy risk and on each of the respective levels of privacy risk associated with the one or more differences in key words or phrases; and generating the current privacy risk score for the application or website based on the current privacy risk score for the current version of the policy.

10. The method of claim 1, wherein the policy includes at least one of a privacy policy, a terms and conditions agreement, a data usage policy, a terms of use policy, a terms of service agreement, permissions, an agreement requiring acceptance prior to execution of the application or website, a social media policy, a website user policy, a customer loyalty program agreement, or a financial services agreement.

11. A system comprising:
at least one processor;
memory coupled to the at least one processor; and
program instructions stored in the memory and executable by the at least one processor, the program instructions when executed by the at least one processor causing the at least one processor to perform the steps of:
awaiting satisfaction of a trigger condition;
upon detecting the satisfaction of the trigger condition, obtaining a current version of a policy associated with an application or website, the current version of the policy being in a machine-readable format;

comparing the current version of the policy against a previous version of the policy associated with the application or website to identify one or more differences in key words or phrases, the one or more differences in key words or phrases including one or more added key words, added phrases, removed key words, or removed phrases, each of the one or more differences in key words or phrases corresponding to one or more interactions of the application or website, the one or more interactions comprising use of functionality of a computing device or use of personal information of a user;

for each difference in key word or phrase previously associated with a particular level of privacy risk, retrieving the particular level of privacy risk for the difference in keyword or phrase from a database;

for each difference in keyword or phrase not previously associated with the particular level of privacy risk:

generating a respective level of privacy risk associated with one or more particular interactions of the application or website corresponding to the difference in key word or phrase;

associating the respective level of privacy risk to the difference in key word or phrase; and storing in the database the difference in key word or phrase and the respective level of privacy risk associated with the difference in key word or phrase;

generating a current privacy risk score based at least on each of the particular levels of privacy risk and on each of the respective levels of privacy risk associated with the one or more differences in key words or phrases for the current version of the policy associated with the application or website;

determining if there was a privacy risk change based on the current version of the policy in view of the previous version of the policy; and if there was a privacy risk change, then notifying the user of the privacy risk change.

12. The system of claim 11, wherein the trigger condition includes a determination whether a predetermined amount of time has elapsed.

13. The system of claim 11, wherein the trigger condition is based on a notification preference set by the user.

14. The system of claim 11, wherein the previous version of the policy includes a stored version of the policy that was used to generate a previous privacy risk score.

15. The system of claim 11, wherein the current privacy risk score indicates a level of privacy risk associated with the application or website.

16. The system of claim 11, wherein the current privacy risk score indicates a level of privacy risk associated with a category associated with the application or website.

17. The system of claim 11, wherein the privacy risk change includes a change between the current privacy risk score and a previous privacy risk score.

18. The system of claim 11, wherein the privacy risk change includes a change in the one or more interactions of the application or website.

19. The system of claim 11, wherein the step of generating the current privacy risk score for the application or website comprises:

generating a current privacy risk score for the current version of the policy based at least on each of the particular levels of privacy risk and on each of the respective levels of privacy risk associated with the one or more differences in key words or phrases; and generating the current privacy risk score for the application or website based on the current privacy risk score for the current version of the policy.

20. The system of claim 11, wherein the policy includes at least one of a privacy policy, a terms and conditions agreement, a data usage policy, a terms of use policy, a terms of service agreement, permissions, an agreement requiring acceptance prior to execution of the application or website, a social media policy, a website user policy, a customer loyalty program agreement, or a financial services agreement.

* * * * *